United States Patent
Kafantaris

(10) Patent No.: US 11,073,247 B2
(45) Date of Patent: Jul. 27, 2021

(54) EXPLOSION CONTAINMENT AND REDIRECTION SYSTEM

(71) Applicant: Hyperion Motors, Inc., Orange, CA (US)

(72) Inventor: Constantine E. Kafantaris, Orange, CA (US)

( * ) Notice: Subject to any disclaimer, the term of this patent is extended or adjusted under 35 U.S.C. 154(b) by 0 days.

(21) Appl. No.: 16/657,853

(22) Filed: Oct. 18, 2019

(65) Prior Publication Data
US 2021/0116074 A1 Apr. 22, 2021

(51) Int. Cl.
*F17C 13/12* (2006.01)

(52) U.S. Cl.
CPC .... *F17C 13/126* (2013.01); *F17C 2201/0109* (2013.01); *F17C 2201/035* (2013.01); *F17C 2203/0646* (2013.01); *F17C 2203/0663* (2013.01); *F17C 2205/0323* (2013.01); *F17C 2205/0352* (2013.01); *F17C 2205/0394* (2013.01); *F17C 2221/012* (2013.01); *F17C 2260/011* (2013.01); *F17C 2260/042* (2013.01); *F17C 2270/01* (2013.01)

(58) Field of Classification Search
CPC .......... F42D 5/04; F42D 5/045; F41C 13/126; F41C 2201/0109; F41C 2201/035; F41C 2203/0646; F41C 2203/0663; F41C 2206/0323; F41C 2206/0352; F41C 2206/0395; F41C 2221/012; F41C 2260/011; F41C 2260/042; F41C 2270/01
USPC .......................................................... 86/50
See application file for complete search history.

(56) References Cited

U.S. PATENT DOCUMENTS

| | | | | |
|---|---|---|---|---|
| 3,929,286 | A * | 12/1975 | Hastings | B05B 5/1608 239/3 |
| 4,905,855 | A * | 3/1990 | Troiano | F17C 13/084 206/0.6 |
| 4,988,014 | A * | 1/1991 | Varghese | F17C 3/08 62/45.1 |
| 7,731,052 | B2 * | 6/2010 | Rappaport | B65D 90/06 220/592.24 |
| 2001/0037549 | A1 * | 11/2001 | Fenton | A62C 3/06 29/401.1 |
| 2011/0000909 | A1 * | 1/2011 | Huang | F17C 13/126 220/88.1 |
| 2012/0298680 | A1 * | 11/2012 | Smith | F17C 3/00 220/745 |
| 2014/0144921 | A1 * | 5/2014 | Ells | F17C 13/083 220/694 |
| 2015/0362129 | A1 * | 12/2015 | Antonelli | H01M 4/383 206/0.7 |

(Continued)

*Primary Examiner* — Joshua E Freeman
(74) *Attorney, Agent, or Firm* — Kafantaris Law Offices; Theo Kafantaris

(57) ABSTRACT

The present invention provides a system configured to contain and redirect any explosion caused by the combustible gas as a safety precaution. This is accomplished through a cover, a floor plate, and one or a plurality of tanks adapted to retain high pressure combustible gas. The cover and floor plate will create an extremely rigid and temperature-resistant enclosure, while the tanks are positioned inside said enclosure. These components work in conjunction to provide a lightweight and compact system configured to contain an explosion, and alternatively, to redirect the explosion and resultant shrapnel downward and through the floor plate if the explosion cannot be contained.

18 Claims, 4 Drawing Sheets

(56) References Cited

U.S. PATENT DOCUMENTS

2016/0137272 A1\* 5/2016 Uraguchi ................ F17C 1/002
                                                    220/560.11
2016/0341360 A1\* 11/2016 Uraguchi ................ B63B 25/14
2017/0182883 A1\* 6/2017 Matijevich ............. B60K 15/07
2018/0283610 A1\* 10/2018 Wexler ............. B60K 15/03006

\* cited by examiner

EXPLOSION CONTAINMENT AND REDIRECTION SYSTEM

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE INVENTION

This invention relates to a system and apparatus for containing and redirecting an explosion, and more particularly, to a system and apparatus for the containment and redirection of an explosion caused by compressed hydrogen gas as a safety precaution.

DISCUSSION OF RELATED ART

Hydrogen is a colorless, odorless and combustible gas, the lightest and most abundant substance in the universe. Hydrogen readily forms with most non-metallic elements such as oxygen, carbon, and nitrogen. In fact, most of the hydrogen on our planet is bound to oxygen in the form water ($H_2O$), which is our most abundant compound.

The uses of hydrogen are plentiful, ranging from fertilizer to hydrocracking to fuel cells and more. When not bound to other elements, hydrogen is traditionally stored as a compressed gas ($H_2$) at pressures up to and exceeding 10,000 PSI. Storing hydrogen at such high pressures requires specialized tanks that are built to withstand incredible force, both inward and outward, but also present unique risks.

Any concentration of combustible gas presents a risk of explosion or fire. This is particularly critical in the case of hydrogen because it ignites at a mere 4% concentration of air. Furthermore, hydrogen burns with an invisible flame at incredible temperatures. Moreover, hydrogen has a fast flame front, which allows it to engulf other flammable materials quickly and across a vast space. As such, whenever working with compressed hydrogen, it is very important to plan for emergency situations.

While safety systems exist in the prior art for mitigating the risk of working with compressed combustible gases, namely ventilation systems adapted to release the gas to the environment in an emergency, there is a continued need for a system configured to contain and redirect any explosion caused by the combustible gas as a safety precaution while maintaining a low weight and size profile. The present invention satisfies these needs.

SUMMARY OF THE INVENTION

The present invention will provide a system configured to contain and redirect any explosion caused by the combustible gas as a safety precaution while maintaining a low weight and size profile. This is accomplished through a cover, a floor plate, and one or a plurality of tanks adapted to retain high pressure combustible gas. The cover and floor plate will create an extremely rigid and temperature-resistant enclosure, while the tanks are positioned inside said enclosure. These components work in conjunction to provide a lightweight and compact system configured to contain an explosion, and alternatively, to redirect the explosion and resultant shrapnel downward and through the floor plate if the explosion cannot be contained.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DETAILED DESCRIPTION OF THE PREFERRED EMBODIMENT

Figure 1:
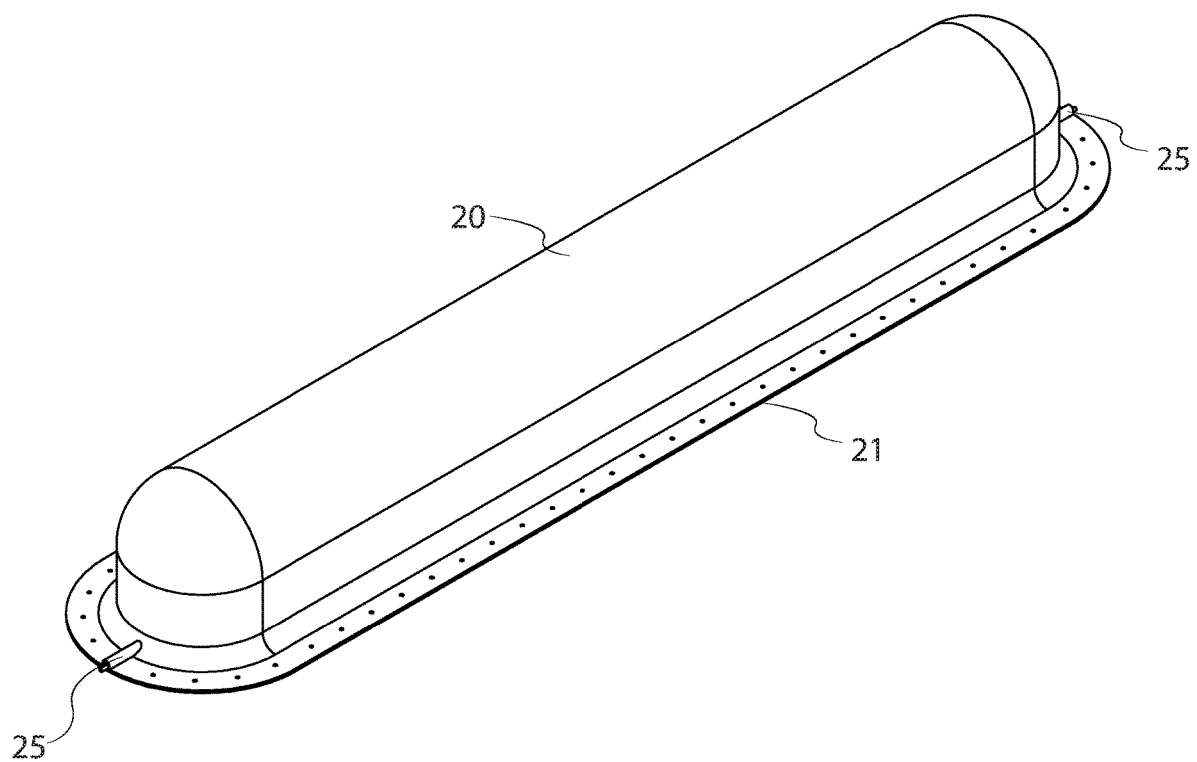
FIG. 1 is a front perspective view of the explosion containment and redirection system according to one embodiment of the present invention.
Figure 2:
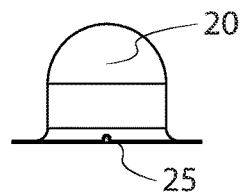
FIG. 2 is a side view therein.
Figure 3:
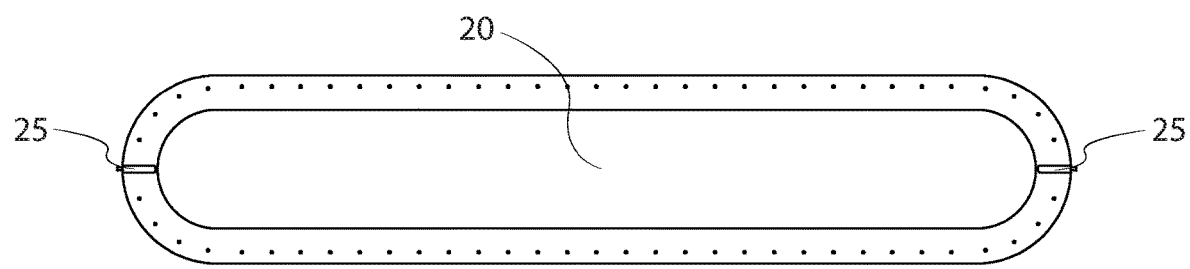
FIG. 3 is a top view therein.
Figure 4:
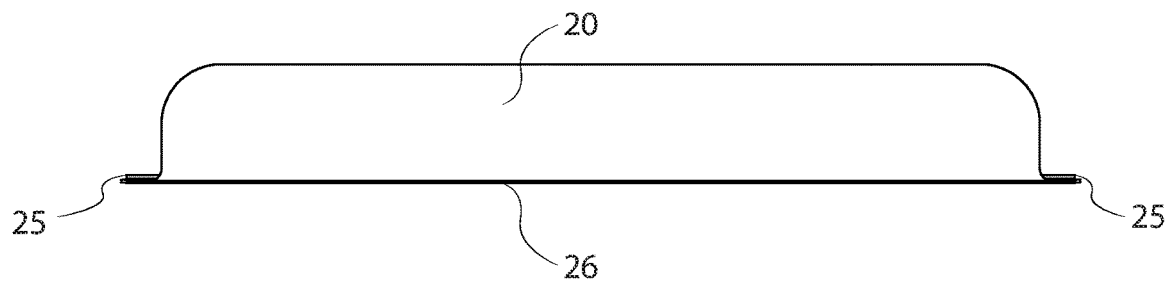
FIG. 4 is a front view therein.
Figure 5:
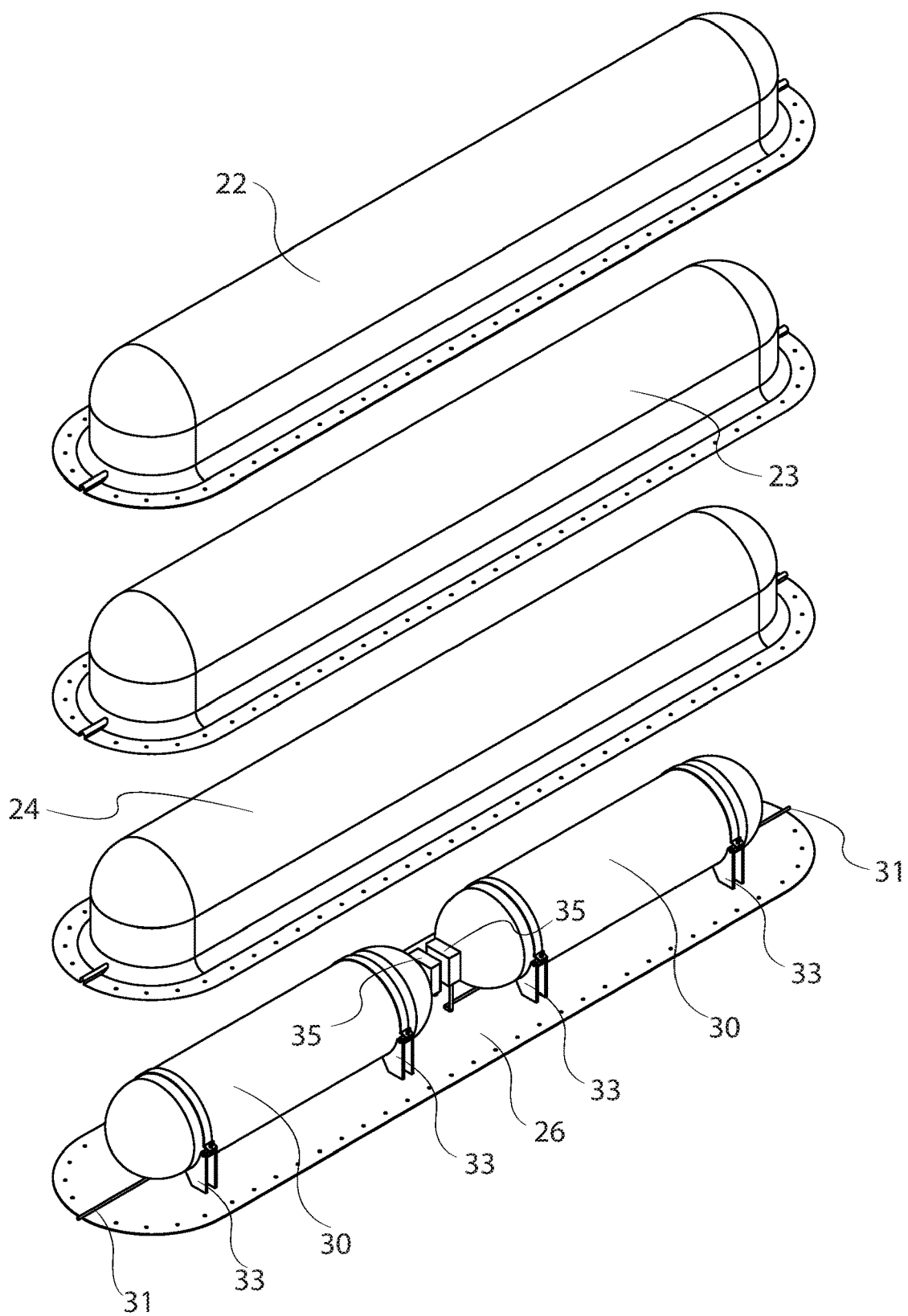
FIG. 5 is a front perspective exploded view therein.
Figure 6:
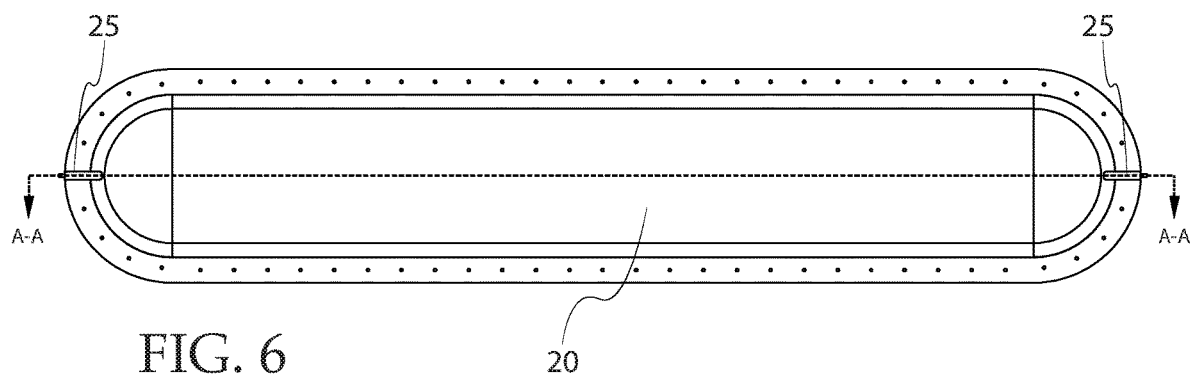
FIG. 6 is a top view therein with section line A-A.
Figure 7A:
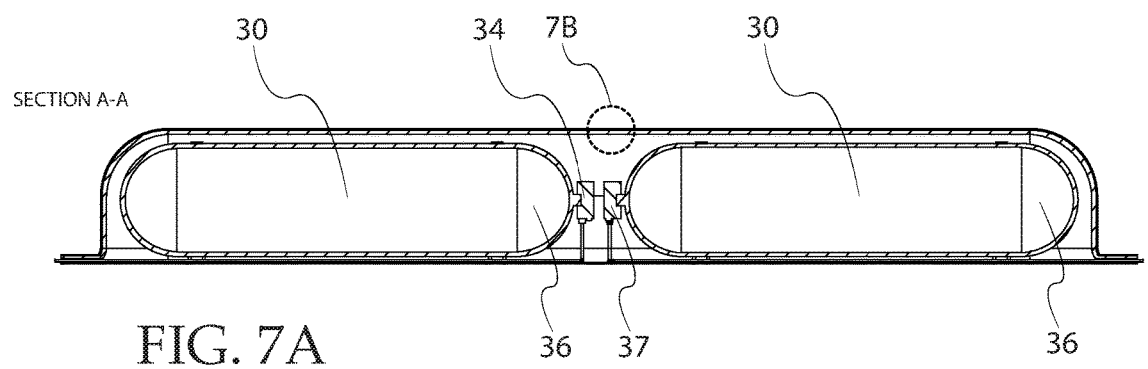
FIG. 7A is a front sectional view therein taken along line A-A.
Figure 7B:
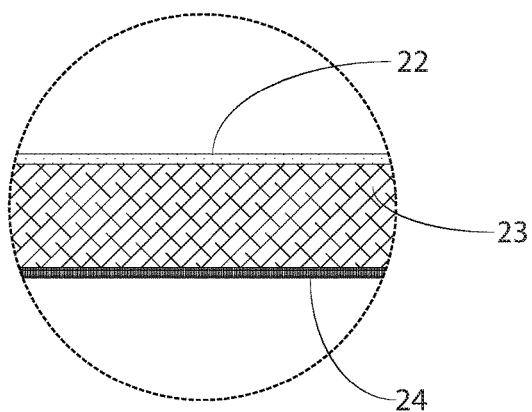
FIG. 7B is a front detailed view of element 7B from FIG. 7A.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The explosion containment and redirection system comprises a cover 20, a floor plate 26, and one or a plurality of tanks 30 adapted to retain high pressure combustible gas. The cover 20 and floor plate 26 will create an extremely rigid and temperature-resistant enclosure, while the tanks 30 are positioned inside said enclosure. These components work in conjunction to provide a lightweight and compact system configured to contain an explosion, and alternatively, to redirect the explosion and resultant shrapnel downward and through the floor plate 26 if the explosion cannot be contained.

The cover 20 comprises three distinct material layers that are selected for their heat resistance, tensile strength, and durability. The cover 20 has a generally cylindrical shape such that it can redirect any outward forces back inward and downward toward the floor plate 26. The cover 20 further comprises a pair of opposing ports 25 adapted to receive a plurality of pipes 31. The plurality of pipes 31 are in fluid connection with the tanks and are configured to deliver and withdraw the compressed combustible gas to and from the tanks 30. The cover 20 further comprises a flange 21, wherein a plurality of fasteners are configured to join the cover 20 to the floor plate 26.

The first material layer is a synthetic fiber layer 22 such as Kevlar. Kevlar is selected because it has a very high tensile strength-to-weight ratio and will be very difficult to penetrate. The synthetic fiber layer 22 is the innermost layer, and as such, is the first layer that any shrapnel will encounter in the event of an explosion. In the preferred embodiment, the synthetic fiber layer 22 is configured to withstand temperatures up to 450° Celsius and has a tensile strength exceeding 500,000 psi.

The second material layer is an aluminum layer 23. Aluminum is selected because it is rigid, light in weight, and very durable. The aluminum layer 23 is positioned between the first and third material layers, and as such, is the second layer that any shrapnel will encounter in the event of an explosion. The aluminum layer 23 will provide structural support for the cover and provides a surface for the first and third layers to bond to.

The third material layer is a carbon fiber layer 24. Carbon fiber is selected because it has a very high tensile strength, is light weight, and will provide additional protection from any external elements. The carbon fiber layer 24 is the outermost layer, and as such, is the last layer that any shrapnel will encounter in the event of an explosion. In the preferred embodiment, the carbon fiber layer 24 is configured to withstand temperatures up to 2000° Celsius and has a tensile strength exceeding 800,000 psi.

The floor plate 26 is configured to provide rigidity to the system and provide a failsafe in the event of a catastrophic failure. The floor plate 26 is made of a rigid and durable material capable of withstanding high temperature and pressure. In the preferred embodiment, the floor plate 26 is made of steel. The floor plate 26 is further configured to be a failsafe for the present invention. More specifically, if the explosion cannot be contained within the enclosure, all of the shrapnel will be redirected downward toward the floor plate 26 due to the shape of the cover 20. As the floor plate 26 does not match the tensile strength of the cover 20, the floor plate 26 will give way before the cover 20, and as such, the explosion will rupture the floor plate 26 and exit through the bottom of the device. This is by design, and any implementation of the present invention should take this into consideration.

The tanks 30 are filled with compressed, combustible gas. Each tank 30 is made from a composite material such as carbon fiber, adapted to withstand immense pressure, and a may further comprise a thermoplastic liner configured to retain the compressed gas up to 10,000 PSI. In the preferred embodiment, the compressed combustible gas is compressed hydrogen gas, although any compressed combustible gas can be used.

In the preferred embodiment, a valve 35 is positioned between the tanks 30 and the plurality of pipes 31. The valve 35 is configured to open or close the tanks 30 and activate or deactivate a fluid connection between the combustible gas and the plurality of pipes 31. In an alternative embodiment, a regulator 37 is positioned between the tanks 30 and the valve 35. The regulator 37 is configured to regulate the pressure of the compressed combustible gas from the first pressure to a second pressure and to output the regulated compressed gas to the plurality of pipes 31. The regulator 37 is a normally closed valve, where the regulator 37 must be activated to open and will remain closed unless activated as a safety precaution. These safety precautions will prevent flashback explosions from the back into the tank 20.

In an alternative embodiment, a controller 34 is configured to receive a signal and activate the flow of the compressed combustible gas, enabling the compressed combustible gas to flow to or from the tanks 20. In a further alternative embodiment, a plurality of sensors 36 are in electrical communication with the controller 34. The plurality of sensors 36 further comprise temperature sensors, pressure sensors, collision sensors, fault sensors, directional sensors, and any other sensors which can be used to determine a normal operating state or an emergency state. These sensors 36 may work alone or in conjunction to provide information to the controller 34 to automatically open or close the valves 35 and control the regulator 37.

More specifically, the plurality of sensors 36 will send sensor data to the controller 34, where the sensor data is used to determine whether to automatically open or close the valve 35. For example, if all sensors show values within threshold values, the controller 34 will open or close the valve 35 as needed. Alternatively, if temperature sensors report back values beyond threshold amounts along with fault sensors reporting a catastrophic fault, then the controller 34 will close the valve 35. In an alternative embodiment, the signal may be manually received, such as a manual override to refill the tanks 20.

While the above description contains specific details regarding certain elements, sizes, and other teachings, it is understood that embodiments of the invention or any combination of them may be practiced without these specific details. Specifically, although certain shapes are described and shown in the above embodiments and drawings, any suitable shape may be used. These details should not be construed as limitations on the scope of any embodiment, but merely as exemplifications of the presently preferred embodiments. In other instances, well known structures, elements, and techniques have not been shown to clearly explain the details of the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. An explosion containment and redirection system comprising:
   a tank, said tank filled with compressed combustible gas;
   a floor plate;
   a cover, said cover further comprising a plurality of distinct material layers, said material layers selected for their heat resistance, tensile strength, and durability; and
   a steel floor plate, said steel floor plate configured to provide rigidity to the system, and further configured to have a lower tensile strength than said cover such that, in the event of catastrophic failure, said floor plate will rupture prior to said cover;
   wherein said floor plate and said top create a containment and redirection chamber to retain and direct shrapnel in the event of an explosion.

2. The system of claim 1, wherein said cover further comprises a synthetic fiber layer, wherein said synthetic fiber can withstand temperatures up to 450° Celsius and has a tensile strength exceeding 500,000 psi.

3. The system of claim 1, wherein said cover further comprises an aluminum layer.

4. The system of claim 1, wherein said cover further comprises a carbon fiber layer, wherein said carbon fiber layer can withstand temperatures up to 2000° Celsius and has a tensile strength exceeding 800,000 psi.

5. The system of claim 1, wherein said cover further comprises a synthetic fiber layer, an aluminum layer, and a carbon fiber layer, wherein said aluminum layer is positioned between said synthetic fiber layer and said carbon fiber layer, and wherein said synthetic fiber layer is positioned inside of the chamber and wherein said carbon fiber layer is positioned outside of said chamber.

6. The system of claim 1, wherein said cover further comprises a generally cylindrical shape such that, in the event of an explosion, shrapnel will be redirected downward toward said floor plate.

7. The system of claim 1, further comprising a valve in fluid connection with said tank and configured to deliver and withdraw said compressed combustible gas to and from said tank.

8. The system of claim 7, further comprising a regulator in fluid connection with said valve, said regulator configured to regulate the pressure of said compressed combustible gas.

9. The system of claim 8, further comprising a controller configured to activate said regulator, enabling said compressed combustible gas to flow from said tanks through said regulator to said valve when a signal is received.

10. The system of claim 9, wherein said signal is manually input.

11. The system of claim 9, wherein said controller further comprises a plurality of sensors in electrical communication with said controller, said plurality of sensors further comprising temperature sensors, pressure sensors, fault sensors, collision sensors, and directional sensors, wherein said signals detect whether to automatically activate said regulator.

12. The system of claim 1, further comprising one or a plurality of pipes in fluid connection with said tank and configured to deliver and withdraw said compressed combustible gas to and from said tank.

13. The system of claim 12, further comprising one or a plurality of gas ports positioned through said cover, wherein said gas ports are configured to receive said pipes and allow said compressed combustible gas to enter and leave the enclosure.

14. The system of claim 1, further comprising a plurality of tanks positioned within said enclosure.

15. The system of claim 1, wherein said enclosure is configured to withstand a greater outward force than said floor plate such that, in the event of an explosion, shrapnel will be directed downward through said floor plate as opposed to upward through said cover.

16. The device of claim 1, wherein the tank further comprises a composite material and a thermoplastic liner configured to retain compressed gas up to 10,000 PSI.

17. The system of claim 1, wherein said compressed combustible gas is compressed hydrogen gas.

18. The system of claim 1, wherein said tank is configured to retain said compressed combustible gas at a pressure up to 10,000 PSI.

* * * * *